(No Model.)
S. H. ADAMS.
APPARATUS FOR RAISING SEWAGE.
No. 556,039. Patented Mar. 10, 1896.
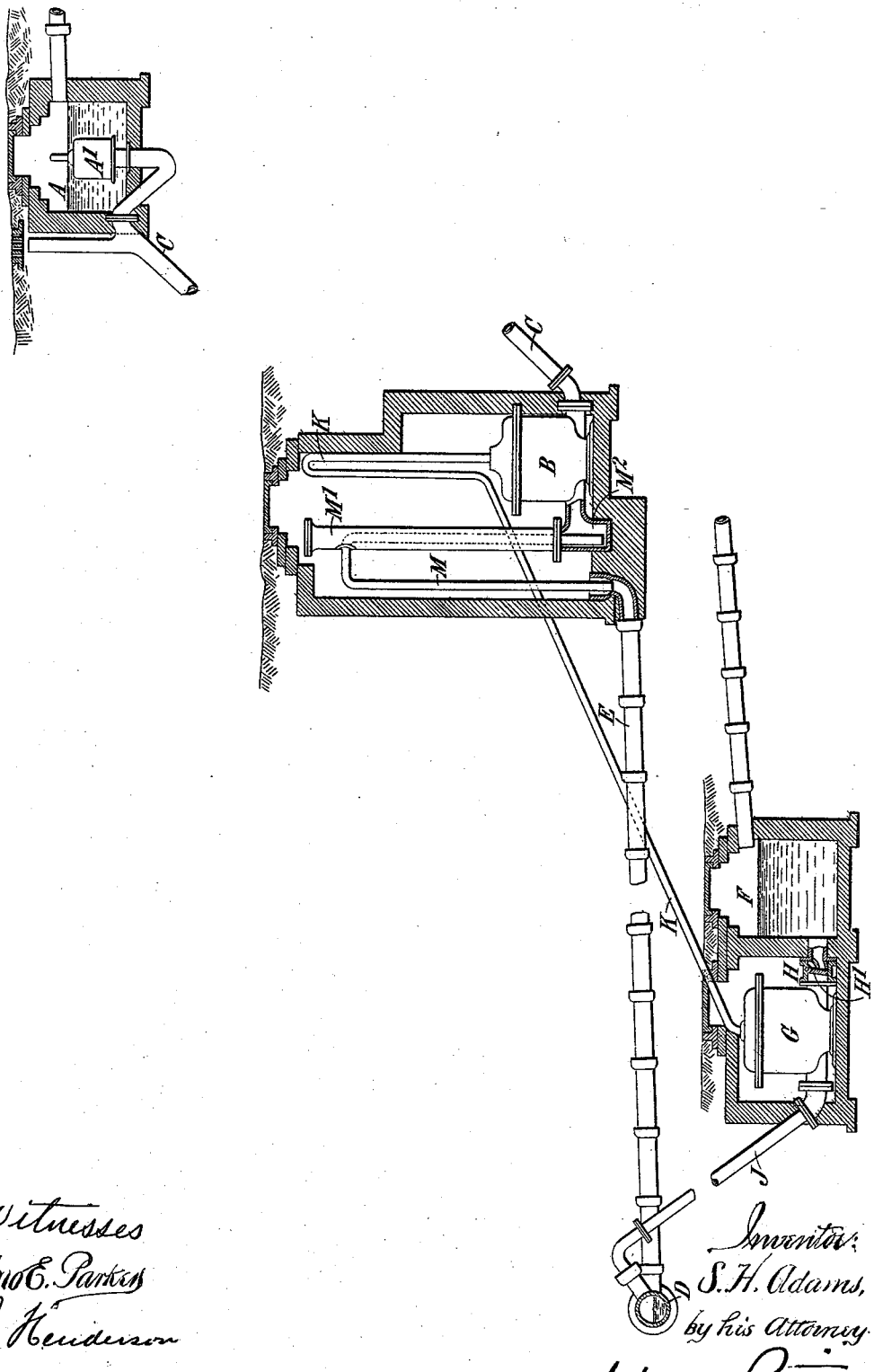
Witnesses
Jno. E. Parker
J. Henderson
Inventor
S. H. Adams,
by his Attorney
Horace Pettit

United States Patent Office.

SAMUEL HENRY ADAMS, OF LONDON, ENGLAND.

APPARATUS FOR RAISING SEWAGE.

SPECIFICATION forming part of Letters Patent No. 556,039, dated March 10, 1896.

Application filed November 27, 1894. Serial No. 530,076. (No model.) Patented in France January 27, 1893, No. 227,369, and in England March 7, 1894, No. 4,754.

*To all whom it may concern:*

Be it known that I, SAMUEL HENRY ADAMS, hydraulic engineer, a subject of the Queen of Great Britain, residing at 5 and 7 Old Queen Street, Westminster, London, England, have invented certain new and useful Improved Apparatus for Raising Sewage, (for which I have obtained patents in Great Britain, No. 4,754, dated March 7, 1894, and in France Patent of Addition, dated May 9, 1894, to Patent No. 227,369, dated January 27, 1893,) of which the following is a specification, reference being had to the accompanying drawings.

My invention relates to improved means for raising to the level of an outfall sewage created below such outfall by means of other sewage or available liquid created above the outfall. I cause the high-level sewage or liquid to exert a pressure upon the air in a closed receptacle. Such air passes by a pipe to another receptacle into which the low-level sewage has entered, and operates to force the latter sewage up a suitable delivery-pipe to the outfall.

By my invention I am able to sewer a low-lying district without employing pumping-engines, and I effect such sewering in an automatic, simple, and economical manner where otherwise the sewering would be difficult and costly, if not impossible.

Referring to the accompanying drawing, which illustrates my invention, A is a tank or vessel into which the high-level sewage flows. A' is a siphon for intermittingly discharging such sewage.

B is an air-chamber below the level of the tank A and communicating therewith by a pipe C.

D is the outfall to which the sewage from the chamber B flows through the drain-pipe E.

F is a storage-tank for the low-level sewage created below the level of the outfall D.

G is a forcing-chamber communicating with the tank F by a short pipe H, which contains a non-return valve H' to prevent the sewage in the chamber G from flowing back to the tank F.

J is the rising main up which the low-level sewage is forced to the outfall D.

K is a pipe forming a communication between the air-chamber B and forcing-chamber G. The said pipe enters the chambers B and G at or near the top, and preferably through the covers thereof.

M is an outlet-siphon for discharging the contents of the chamber B at suitable intervals. This siphon passes down a stand-pipe M' that is longer than the vertical height of the rising main J, and dips into a "sump" or well $M^2$ below the level of the bottom of the chamber B. By each operation of the siphon M the chamber B is quite emptied, and a free air-passage is thus provided through said chamber and air-pipe K from the chamber B to the chamber G.

The high-level sewage which collects in the chamber A is intermittingly and automatically discharged from said chamber by means of the siphon A'. The discharged sewage passes down the pressure-pipe C and enters the closed receptacle B, displacing a proportionate amount of air in the said receptacle or chamber and transferring the air to the chamber G, which, as before stated, communicates with the chamber B. The air thus transferred operates to force up the rising main J and into the outfall D any low-level sewage which may have collected in the chamber G. Such sewage cannot return to the tank F, since the valve H' will be kept closed as long as there is more pressure in the chamber G than in the tank F. When the reverse is the case, the valve H' opens to allow more sewage to flow into the chamber G from the tank F, which sewage is in its turn discharged to the outfall by the next flush of the siphon A'. The sewage or available liquid then rises up the pressure-pipe C until a head accumulates sufficient to start the outlet-siphon M, whereupon the sewage will be drawn off from the chamber B and passed through the drain-pipe E to the outfall D. The chamber will then become recharged with air and the operation of the various parts will be repeated as described.

The length of the stand-pipe M' and the vertical height of the pressure-pipe C must be greater than the vertical height of the rising main J to insure that the pressure of water upon the air in the chamber B shall be sufficient to force the water up the pipe J. The air-pipe K is also bent at its upper end and carried, as shown, to a level higher than that of the top of the pipe M to insure that the liquid shall not pass down the said air-pipe.

The distances apart of the chambers B and C are immaterial to the proper working of the apparatus.

In lieu of the siphons A' and M, I may employ any ordinary sluice-valves to be manipulated by hand, or I may employ suitable automatically-operating valves.

What I claim is—

A sewage system or apparatus comprising an outlet or sewer pipe, D, two storage-tanks, A, F, for the reception of the sewage, one of such tanks being situated above the level of the pipe, D, and the other of said tanks being situated below the level of said pipe, a chamber, G, communicating with the tank, F, and on a level which is not higher than the level of the tank F so that the sewage will gravitate from the tank F to the chamber G, a one-way valve, H', governing the flow of sewage into said chamber from the tank, F, a discharge-pipe, J, leading from the lower portion of the chamber, G, to the sewer-pipe and discharging into the latter at a point above the liquid-level, a chamber, B, situated above the pipe, D, but below the tank, A, a pipe, C, leading from the lower portion of the tank, A, to the lower portion of the chamber, B, a siphon, A', provided in the tank, A, to intermittingly discharge the sewage therefrom through the pipe, C, a discharge-pipe, E, leading to the sewer-pipe, D, a siphon, M, M', connecting the pipe, E, to the chamber, B, and an air-pipe, K, extending from the upper portion of the chamber, B, to the upper portion of the chamber, G, said air-pipe extending upwardly from the chamber, B, to a point above the bend of the siphon, M, M', and thence downwardly to the chamber, G, substantially as specified.

In witness whereof I have hereunto set my hand this 6th day of November, 1894.

SAMUEL HENRY ADAMS.

Witnesses:
CLYDE SHROPSHIRE,
D. T. S. FULLER.